UNITED STATES PATENT OFFICE.

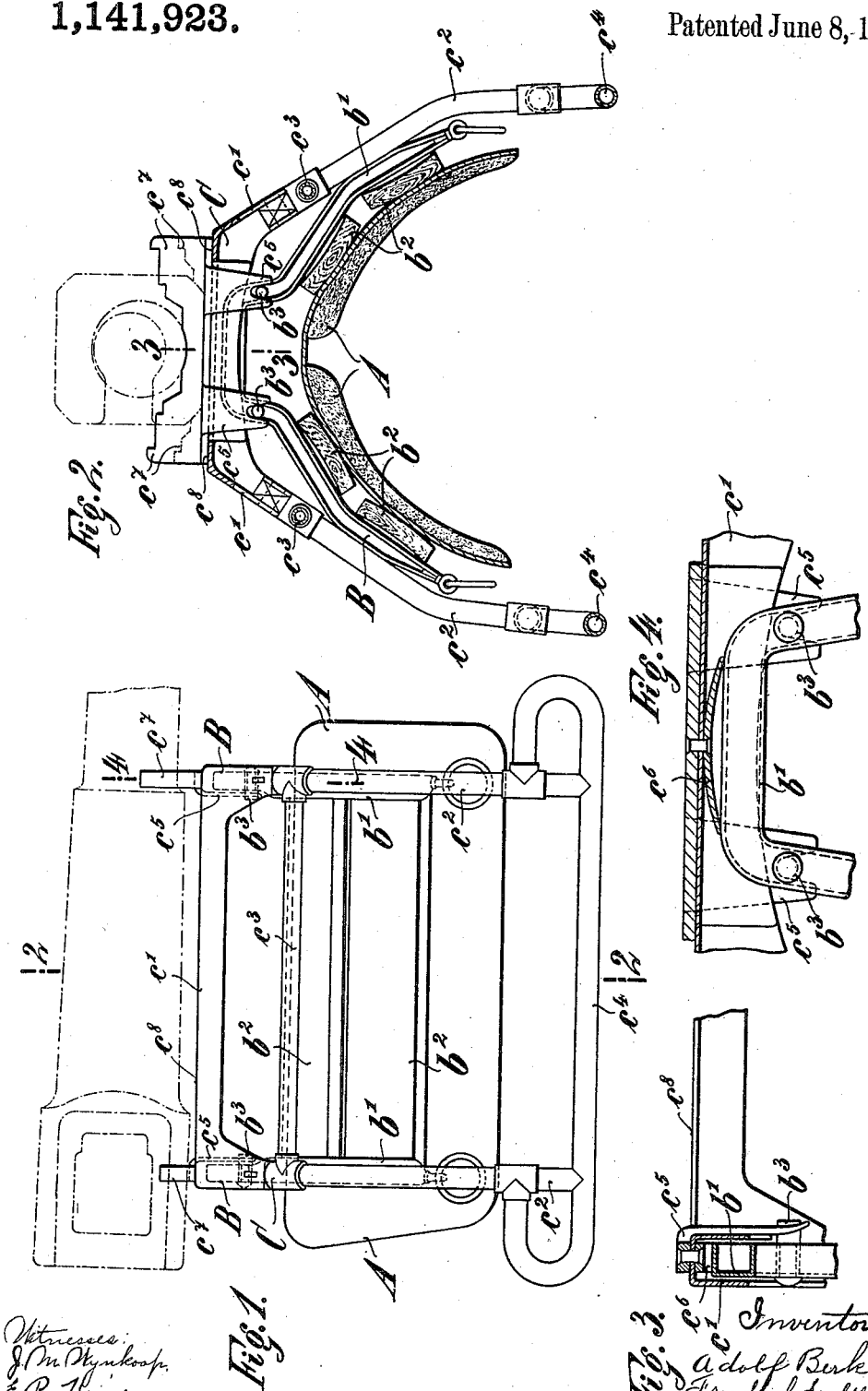

ADOLF BERKER AND FRIEDRICH SACHTLEBEN, OF ESSEN-ON-THE-RUHR, GERMANY, ASSIGNORS TO FRIED. KRUPP AKTIENGESELLSCHAFT, OF ESSEN-ON-THE-RUHR, GERMANY.

DEVICE FOR CONVEYING LOADS ON PACK-ANIMALS.

1,141,923. Specification of Letters Patent. Patented June 8, 1915.

Application filed February 20, 1912. Serial No. 678,977.

*To all whom it may concern:*

Be it known that we, ADOLF BERKER and FRIEDRICH SACHTLEBEN, residing at Essen-on-the-Ruhr, Germany, both subjects of the Emperor of Germany, have invented a certain new and useful Improvement in Devices for Conveying Loads on Pack-Animals, of which the following is a specification.

This invention relates to devices for conveying loads on pack animals, particularly for use with mountain artillery. In known devices of this kind, the carrier, intended for the load, forms an undetachable part of the harness. In consequence, the pack animals have to remain standing with the load attached during short rests, or during ready position, in order to hold the troops ready to march; as an unloading of the animals considering the unavoided loss of time is naturally not permissible, when the fastenings of the load on its carrier first have to be loosened and, on departure, each single load has again to be fastened. In accordance with the present invention this draw-back is removed by supplying a table-shaped frame as carrier of the load, which frame may be set on top of a saddle tree and secured thereto without the assistance of the strapping that holds the saddle tree on the back of the animal.

An embodiment of the invention is illustrated in the accompanying drawings, where—

Figure 1 shows an elevation of the carrying device with the load, consisting of a gun barrel indicated by dot and dash lines; Fig. 2, a section on line 2—2 of Fig. 1 seen from the left side; Fig. 3, a section, in larger scale, on line 3—3 of Fig. 2, seen from the left side and with some parts left out; Fig. 4, a section on line 4—4 of Fig. 1 seen from the right side and with some parts left out.

The device comprises three principal parts namely, pad A, saddle tree B and carrier or frame C.

The saddle tree B consists of two yokes $b^1$ of ⌐ shaped cross section, bent at right angles on the top, which are connected on both sides by means of two wooden strips $b^2$. The pad A and the saddle tree B may be secured to the pack animal in the usual manner by strapping.

The saddle tree B forms the support for the carrier C. This latter consists of a seat $c^1$ and two side frames, each of which is composed of two bars $c^2$, bent at obtuse angles and pointing downward, and two connecting rods $c^3$ $c^4$ at right angles to the former. The lower rods $c^4$, constituting handles, extend beyond the bars $c^2$ and are bent back in an arc to the bars $c^2$ like runners on a sleigh. The bars $c^2$ of the frames are extended so far down, that all possible loads (for instance even gun carriage wheels) may be fastened to the seat $c^1$, so that no part of the load reaches below the rods $c^4$. In general then, the rods have such a position that they, serving as handles as described above, need not be raised higher than to the hips by the men when loading. It is sometimes desirable to make the lower part of the bars $c^2$ telescopic, in order to bring the rods $c^4$ into the most suitable height.

The seat $c^1$ which, seen in plan view, is shaped as a rectangular frame, has a U-shaped cross section above the bends of the yokes $b^1$, see Fig. 3, and fits over the top of the yokes $b^1$ whereby all movement in the length direction of the carrier C is prevented. In order also to prevent any transverse movement of the carrier C, two fork plates $c^5$ are secured to the seat $c^1$ at the two places thereof that lie above the top of the yokes $b^1$, and the bifurcated ends of the fork plates $c^5$ grip across studs $b^3$, secured to the yokes $b^1$. Between each two fork plates $c^5$ is arranged a spring $c^6$ on the under side of the seat $c^1$, Figs. 3 and 4, which springs rest on the top of the yokes $b^1$, yieldingly supporting the carrier C on the saddle tree B. On its upper side which forms an almost plain surface $c^8$, the seat $c^1$ is provided with the bearings $c^7$, shaped as usual to receive the load, such for instance as a gun barrel.

In loading, the load has first to be lifted onto the carrier C, standing on the ground, and strapped fast to the carrier, which can be done comparatively easily, as the load only needs to be raised to a small height. Next the carrier with the load upon it is loaded by pushing it over the back of the animal and hung over the yokes $b^1$ of the saddle tree B in such a manner, that the studs $b^3$ of the yoke enter between the prongs of the fork plate $c^5$. In unloading, the carrier need only be lifted so high, that the fork plates $c^5$ are above the top of the yokes $b^1$. The pack animal may thereupon be led away from under the carrier, and the carrier be set down on the ground, whereby the load remains in its correct position on the carrier. As then the loading and unloading can take place very quickly, while the load remains on the carrier, which is the case for instance when on the march; the pack animals may also be spared considerably, by relieving them from the load during short rests as well as during ready position. As furthermore the rods $c^4$, adapted as handles, are lying comparatively low, the crew need not hold the load with stretched arms, as is now necessary with known devices in loading and unloading, and which is very tiring. As a consequence less power need be expended during the loading and unloading.

A still further advantage of the described device consists in the use of the carrier as a sleigh in crossing ice or snow fields, in consequence of the shape of the rods $c^4$.

Lastly, the carrier, on account of the described formation of its top can be used as an observation seat, as a stand for a mountain forge or a machine gun, or as a table for maps.

We claim:—

1. A pack saddle comprising a pad, a saddle tree and a load carrier, said saddle tree having metal yokes with girth straps for securing said saddle tree and pad to the pack animal, and interengaging locking means on said saddle tree and said load carrier, said means being self locking and self releasing upon mounting said load carrier on said saddle tree and dismounting it respectively.

2. A pack saddle comprising a pad, a saddle tree and a load carrier, said saddle tree having metal yokes with girth straps for securing said saddle tree and pad to the pack animal, and interengaging locking means on said saddle tree and said load carrier, said means being situated at the top of said yokes and being self locking and self releasing upon mounting said load carrier on said saddle tree and dismounting it respectively.

3. A pack saddle comprising a pad, a saddle tree and a load carrier, said saddle tree having metal yokes with girth straps for securing said saddle tree and pad to the pack animal, and interengaging locking means on said saddle tree and said load carrier, said means being self locking and self releasing upon mounting said load carrier on said saddle tree and dismounting it respectively, said means comprising fork plates and studs corresponding thereto.

4. A pack saddle comprising a pad, a saddle tree and a load carrier, said saddle tree having metal yokes with girth straps for securing said saddle tree and pad to the pack animal, and interengaging locking means on said saddle tree and said load carrier, said means being self locking and self releasing upon mounting said load carrier on said saddle tree and dismounting it respectively, said means comprising channels on said load carrier constructed to grip the top portion of each of said yokes.

5. A pack saddle comprising a pad, a saddle tree and a load carrier, said saddle tree having metal yokes with girth straps for securing said saddle tree and pad to the pack animal, interengaging locking means on said saddle tree and said load carrier, said means being self locking and self releasing upon mounting said load carrier on said saddle tree and dismounting it respectively, said means comprising channels on said load carrier constructed to grip the top portion of each of said yokes to prevent longitudinal displacement, fork-plates on said load carrier and corresponding studs on the top portion of said yokes to prevent transverse displacement of said carrier relative to said saddle tree.

6. A pack saddle comprising a pad, a saddle tree and a load carrier, said saddle tree having metal yokes with girth straps for securing said saddle tree and pad to the pack animal, interengaging locking means on said saddle tree and said load carrier, said means being self locking and self releasing upon mounting said load carrier on said saddle tree and dismounting it respectively, said means comprising channels on said load carrier constructed to grip the top portion of each of said yokes to prevent longitudinal displacement, fork plates on said load carrier and corresponding studs on the top portion of said yokes to prevent transverse displacement of said carrier relative to said saddle tree, and springs secured to the underside of said channels and arranged to support said load carrier on top of said yokes.

7. In a device for conveying loads on pack animals, the combination with a saddle tree and straps for securing the saddle tree on the back of the animal, of a detachable table shaped load carrier constructed to be seated on said saddle tree and means for securing said load carrier to said saddle tree independent of said straps, said means comprising channel shaped yokes on the carrier, projections on said saddle tree engaging said channels to prevent longitudinal movement between said carrier and saddle tree; fork shaped plates on the load carrier and studs on the saddle tree engaging said fork shaped plates to prevent transverse movement between said carrier and saddle tree.

The foregoing specification signed at Bar-men, Germany, this 30th day of January, 1912.

ADOLF BERKER. [L. S.]
FRIEDRICH SACHTLEBEN. [L. S.]

In presence of—
 ADOLF HALDEMOANG,
 ALBERT NUFER.

Copies of this patent may be obtained for five cents each, by addressing the "Commissioner of Patents, Washington, D. C."